(12) United States Patent
Daniels et al.

(10) Patent No.: US 11,366,465 B1
(45) Date of Patent: Jun. 21, 2022

(54) REMOTE DIAGNOSIS OF ENERGY OR RESOURCE-CONSUMING DEVICES BASED ON USAGE DATA

(71) Applicant: Palantir Technologies Inc., Palo Alto, CA (US)

(72) Inventors: Dylan Daniels, New York, NY (US); Ulas Ziyan, New York, NY (US)

(73) Assignee: Palantir Technologies Inc., Palo Alto, CA (US)

(*) Notice: Subject to any disclaimer, the term of this patent is extended or adjusted under 35 U.S.C. 154(b) by 443 days.

(21) Appl. No.: 16/042,850

(22) Filed: Jul. 23, 2018

Related U.S. Application Data (60) Provisional application No. 62/536,411, filed on Jul. 24, 2017.

(51) Int. Cl.
*G05B 23/02* (2006.01)

(52) U.S. Cl.
CPC ..... *G05B 23/0283* (2013.01); *G05B 23/0272* (2013.01); *G05B 23/0281* (2013.01)

(58) Field of Classification Search
CPC ............ G05B 23/0283; G05B 23/0281; G05B 23/0272
See application file for complete search history.

(56) References Cited

U.S. PATENT DOCUMENTS

| | | | | |
|---|---|---|---|---|
| 2005/0144537 A1* | 6/2005 | Cataltepe | ............ | G05B 23/0243 714/47.2 |
| 2011/0282630 A1* | 11/2011 | Rikkola | ................. | G05B 23/02 702/184 |
| 2014/0266755 A1* | 9/2014 | Arensmeier | ............. | F24F 11/62 340/679 |
| 2015/0160098 A1* | 6/2015 | Noda | ................. | G05B 23/0281 702/35 |
| 2016/0018835 A1* | 1/2016 | Gaasch | ..................... | G05F 1/66 700/291 |
| 2016/0321587 A1* | 11/2016 | Gitt | .................. | G06Q 10/06313 |
| 2018/0204116 A1* | 7/2018 | Evans | ................. | G06N 3/0454 |

OTHER PUBLICATIONS

Wikipedia: Normalization <https://en.wikipedia.org/w/index.php?title=Normalization&oldid=790643461> version Jul. 15, 2017 (Year: 2017).*

(Continued)

*Primary Examiner* — Mohammad K Islam
(74) *Attorney, Agent, or Firm* — Sheppard Mullin Richter & Hampton LLP (57) ABSTRACT

Systems and methods are provided to retrieve or analyze usage data collected from a device or a facility where the device, optionally with devices are located, and identify useful features for making a diagnosis of the device. The diagnosis can be made before a system failure to reduce down time and inefficient use of the device, or after the system failure to expedite and facilitate diagnosis and repair. In addition to the usage data, such as energy and resource consumption, the system can also obtain information relating to the facility and the device's external environment which can be used for normalizing the usage data. Further, based on the diagnosis, the system can make suitable recommendations for repair, replacement, maintenance and upgrade.

18 Claims, 7 Drawing Sheets

(56) References Cited

OTHER PUBLICATIONS

Wikipedia: Receiver operating characteristic ("Wikipedia: ROC") <https://en.wikipedia.org/w/index.php?title=Receiver_operating_characteristic&oldid=789246840> version Jul. 6, 2017 (Year: 2017).*

Dobson Paper: < https://www.stark.co.uk/resources/news/degree-days-reporting/> dated Jan. 18, 2017 and retrieved Apr. 4, 2021 (Year: 2017).*

Wikipedia: Electricity meter < https://en.wikipedia.org/w/index.php?title=Electricity_meter&oldid=789354121> version dated Jul. 6, 2017 (Year: 2017).*

\* cited by examiner

REMOTE DIAGNOSIS OF ENERGY OR RESOURCE-CONSUMING DEVICES BASED ON USAGE DATA

CROSS REFERENCE TO RELATED APPLICATIONS

This application claims the benefit under 35 U.S.C. § 119(e) of U.S. Provisional Application Ser. No. 62/536,411, filed Jul. 24, 2017, the content of which is incorporated by reference in its entirety into the present disclosure.

BACKGROUND

There is a growing number of devices in the home that are connected to the Internet or computation-capable devices. The concept of "smart home" involves the control and automation of lighting, heating (such as smart thermostats), ventilation, air conditioning (HVAC), and security, as well as home appliances such as washer/dryers, ovens or refrigerators/freezers. These devices, when remotely monitored and controlled via the Internet, are an important constituent of the Internet of Things (IoT). Likewise, there are growing interests in smart offices, smart factories and smart cities. In addition to providing convenience in using and controlling these devices, data collected from these devices can be used for detecting problems, increasing efficiency, and saving energy, and thus are ultimately beneficial to the owners of the facilities and the society at large.

For example, smart thermostats can be used for controlling a facility's heating and/or air conditioning. Smart thermostats are typically connected to the internet and allow users to adjust heating settings from other internet-connected devices, such as smartphones. This allows users to easily adjust the temperature remotely. Smart thermostats also record internal/external temperatures, time the HVAC system that has been running and can send notifications to a user. Another example device for collecting data from a device is a smart meter that records consumption of electric energy in intervals of an hour or less and communicates that information back to a central system for monitoring and billing.

The enormous amounts of data generated from these devices can present a great challenge to users that attempt to identify useful information from the data for the purpose of energy saving or maintenance.

SUMMARY

Typically, repair or replacement of an energy or resource-consuming device is triggered by a system failure. It can be readily appreciated, however, that the device may have already been malfunctioning for a period of time before the failure, or functioning at a lower efficiency or generating a less-than-desired output. Some of the devices may come with a limited set of diagnostic tools for detecting malfunctioning, but it is up to the user to decide on when to use the tools. As a result, even such limited tools are rarely used, leaving the devices operating under suboptimal conditions for a long time, which can waste energy and resources and cause unnecessary damages to the devices.

A claimed solution rooted in computer technology overcomes problems specifically arising in the realm of computer technology. In various implementations, a computing system is configured to retrieve or analyze data collected from devices and/or the facility where the devices, optionally together with other devices, are located, and identify information from the data that may be useful for diagnosis. In some implementations, a computing system is configured to conduct a diagnosis for one or more devices and report results of the diagnosis to a user. In some implementations, a computing system is configured to present various types of data relating to the diagnosis on a suitable user interface which enables a user to visualize, analyze and annotate the data. In some implementations, a computing system is configured to make recommendations, based on the diagnosis, with respect to repair, replacement, maintenance and upgrades.

In accordance with one embodiment of the present disclosure, provided is a method of determining the efficiency of a device at a facility. In some embodiments, the method entails retrieving energy or resource usage data for the device or the facility for a period of time; obtaining a property of the facility and environmental information during the period of time; normalizing the usage data with the property of the facility and the environmental information; and determining, by one or more processors, the efficiency of the device with one or more features extracted from the normalized usage data with a data analysis model.

In some embodiments, the energy or resource usage comprises usage of electricity or natural gas. In some embodiments, the property of the facility is selected from square footage of the facility, square footage of a room in which the device operates, age of the facility, type of insulation used in the facility, direction of windows of the facility, and the combination thereof. In some embodiments, the environmental information comprises external temperature, humidity, strength of sunlight, atmospheric pressure, altitude, latitude, wind speed and the combinations thereof. In some embodiments, the normalization comprises determination of expected energy or resource usage for the type of the device based on the property of the facility and the environmental information.

In some embodiments, the one or more features is selected from the group consisting of external temperature gradient, one or more metrics of rolling averages, maximal usage, distribution of usages, first derivative of a usage curve, frequency and duration of on and off, heights of peaks, heights of troughs, differences between peaks and troughs, differences between adjacent peaks and troughs, temperatures at which the device is switched on, temperatures at which the device is switched off, and combinations thereof.

In some embodiments, the data analysis model is selected from random forest, support vector machine, neural network, linear discriminant analysis, quadratic discriminant analysis, and nearest neighbor. In some embodiments, the one or more features are selected by a method comprising calculating a receiver operator characteristics (ROC) curve wherein the area under curve (AUC) of the ROC curve is indicative of the diagnostic ability of a test feature.

In some embodiments, the method further entails displaying, on a user interface, the energy or resource usage data over the period of time, plotting the efficiency over the period of the time on the user interface, and/or displaying a recommendation, based on the determined efficiency, for repair, maintenance, replacement or upgrade.

Systems and non-transitory computer-readable medium are also provided that are suitably configured to implements the various embodiments of the above methods.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the technology are utilized, and the accompanying drawings of which:

DETAILED DESCRIPTION

The technology described herein, in some embodiments, relates to systems and methods for retrieving and analyzing usage data generated from the operation of devices. The term "energy or resource-consuming devices" or "devices" as used herein refers to electrical, mechanical, or heating devices which accomplish one or more household, office, manufacturing, farming or other similar functions and require consumption of energy or other resources (e.g., natural gas). Non-limiting examples of devices include lighting fixtures, heaters, ventilators, air conditioners, washers and dryers, ovens, stoves, toasters, refrigerators or freezers, home or office computers, home theater systems, printers, copier, projectors, and fans.

"Usage data" of a device or a facility wherein the device is located can include energy or resource consumption and operation conditions and results. For example, the data may include temperature of certain portion of the device during operation which may be a result of the operation or malfunctioning. Another example is the energy consumption of the device. Energy consumption may be the use of electricity by the device or consumption of a different energy source, such as natural gas. The usage data may be obtained from the device directly if a suitable sensor or meter is equipped with the device. In addition or alternatively, the usage data of a device can be derived from the overall usage of the facility wherein the device is located. In some examples, the data can be represented as or constructed into a time series, such as energy (or resource) consumptions at a number of consecutive time intervals. In another example, the data may include messages or signals sent from the device that include troubleshooting codes. In another example, the data may include the make and model of the device, the manufacturing date, the date of first operation, and/or the expected life span (or alternatively the expected date of replacement or maintenance).

In some embodiments, the computing system is also configured to retrieve information about the environment in which the device operates. Examples of such information include temperature inside the facility, temperature outside the facility, humidity, strength of sunlight to which the facility is exposed, atmospheric pressure, altitude, latitude, and wind speed. A particular example is the "external temperature," which can be the temperature outside the facility for a facility-wide device such as central air conditioner, or the temperature inside a facility where a regional device (e.g., freezer or refrigerator) is located. The environmental information, in one embodiment, can be obtained from a weather database or obtained from meters installed in the facility.

In some embodiments, the computing system is further configured to receive property information about the facility, such as the square footage of the facility or the room in which the device operates. Other examples of property information about the facility include the age of the facility, type of insulation used in the facility, direction of windows of the facility, the date of the most recent renovation, and energy usage from another device in the facility, without limitation. The facility property information, in some embodiments, may be obtained from a real estate database.

The usage data used for the analysis, in some embodiments, can be pre-processed. Pre-processing may include, without limitation, removal of obvious errors such as outliers, and normalization of a time series such that the data can be compared to a different time series or a different device of the same kind. Normalization can be done with a predefined range, an internal reference, or an external reference.

In some embodiments, the normalization is done with reference to information about the environment and/or the facility, both of which are described above. For instance, for an air conditioning (AC) unit, the reference may include the square footage of the facility, the outside temperature of the facility, and/or whether the AC unit is used for the entire facility or just one or more rooms in the facility. In some embodiments, the normalization uses a regression methodology to estimate expected usage based on the environmental and facility information as independent variables. In some embodiments, the normalized value is obtained by subtracting the calculated expected usage from the observed usage, or alternatively further adding the difference back to a mean usage.

The usage data can be analyzed with various methods including, without limitation, those commonly used in pattern recognition and machine learning. The analysis may be supervised or unsupervised, may be parametric or non-parametric. In a supervised analysis, for instance, the data can be categorized into two or more groups. In one embodiment, a goal of the data analysis may be to identify attributes ("features") from the data series ("data sets") that are useful for conducting a diagnosis of the device. Accordingly, the data can be categorized into an "efficient" group and an "inefficient" group.

The terms "efficient" and "inefficient" are relevant terms to denote different conditions under which a device is operated, whereas the efficient condition is a more-desired condition and the inefficient condition is less desired or not desired. In one example, an efficient condition is a condition more similar to when the device is new or has just been maintained or repaired, than to when the device breaks down or when a repair, replacement or other types of maintenance services are required.

Figure 1A:
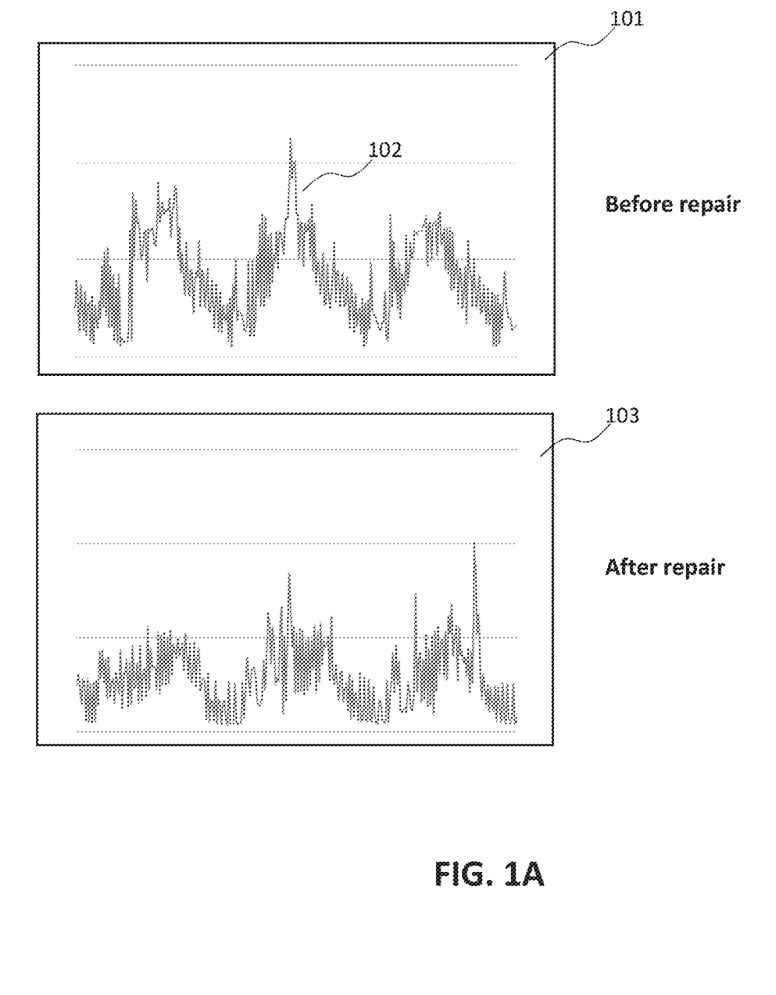
FIG. 1A shows example electricity usage data of a facility before (upper panel) and after (lower panel) a repair.

In some embodiments, a group of data sets representing an efficient condition can be obtained from a device shortly after a repair or replacement. A group of data sets representing an inefficient condition, accordingly, can be obtained from the same device (or its replacement) prior to the repair or replacement. FIG. 1A includes the illustration of a data set collected from a facility having a HVAC system device before a repair (upper panel 101) that represents an inefficient condition. A data set collected from the same facility after the repair of the HVAC system (lower panel 103) represents an efficient condition of the HVAC system. In each panel, the curve 102 is constructed with data points, each of which represents the amount of energy consumption for a 15-minute time interval in the facility.

After the data sets are categorized into groups, a supervised learning method can be used to identify features useful for distinguishing data sets representing efficient conditions from those representing inefficient conditions. In some embodiments, candidate features can be chosen and evaluated.

Figure 1B:
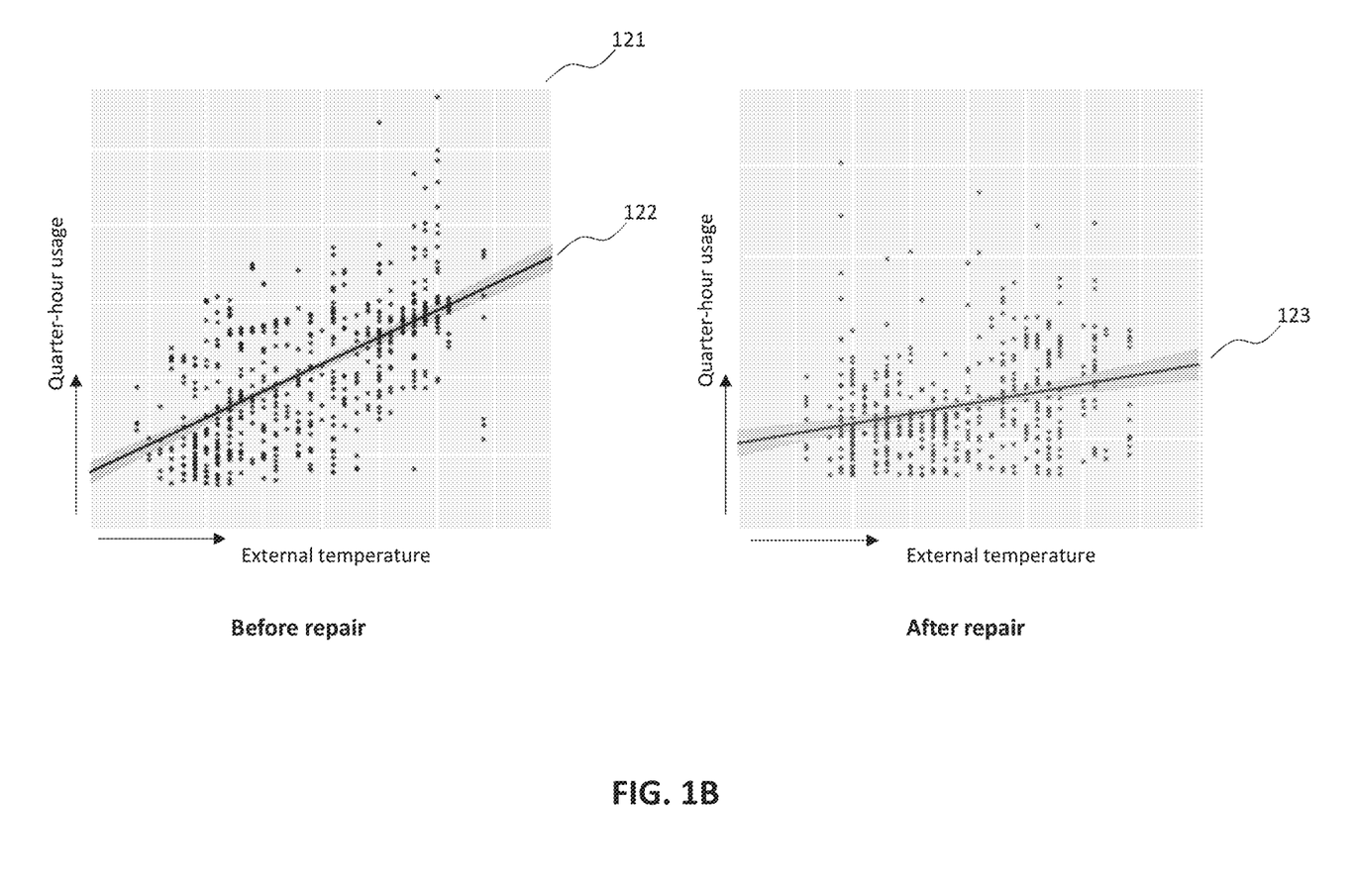
FIG. 1B shows that the external temperature gradients can be useful for distinguishing usage data obtained when a HVAC system at the facility is operated under a relatively inefficient condition (e.g., before repair, left panel) from those obtained when the HVAC system is operated under a relatively efficient condition (e.g., after repair, right panel).

An example candidate feature is an "external temperature gradient," which denotes the additional energy consumption per degree change in external temperature. The idea of using external temperature gradients to distinguish an efficient condition from an inefficient condition is illustrated in FIG. 1B. In FIG. 1B, each panel (e.g., 121) presents a scatter plot of quarter-hour energy consumption over external temperatures and includes a trend line, 122 and 123. Apparently, under the inefficient condition (before repair), there are generally higher energy consumption increase per degree increase in the external temperature. Accordingly, these charts show that the external temperature gradient can be a useful feature for diagnosis.

Another example candidate feature can be selected from various metrics of a rolling window. For a data set with data points collected every 15 minutes, for example, a rolling window can be an hour, or two hours, without limitation. Transformation from the original data set to one with the rolling window, therefore, can smoothen the curves and reduce errors. Upon such transformation, certain metrics can be obtained, such as maximum, minimum, medium, and distribution (e.g., at how many percentage of the time the rolling average is below a threshold value) of the rolling averages.

In addition to external temperature gradient and the metrics based on rolling windows, other example candidate features include maximal usage (e.g., how often the data points fall in the general top decile), distribution of usage (e.g., percentages of data points at low, low-medium, high-medium and high regions), first derivative of the usage curve, frequency and duration of on/off of the device, heights of peaks, heights of troughs, differences between peaks and troughs, differences between adjacent peaks and troughs, temperatures at which the device is switched on, temperatures at which the device is switched off, changes or trends of any of the features over time, and time from most recent repair or replacement. To screen for new candidate features, a data set can be divided into a training set and testing set where a data analysis model for one or more features can be trained with the training set and tested with the testing set.

Figure 2:
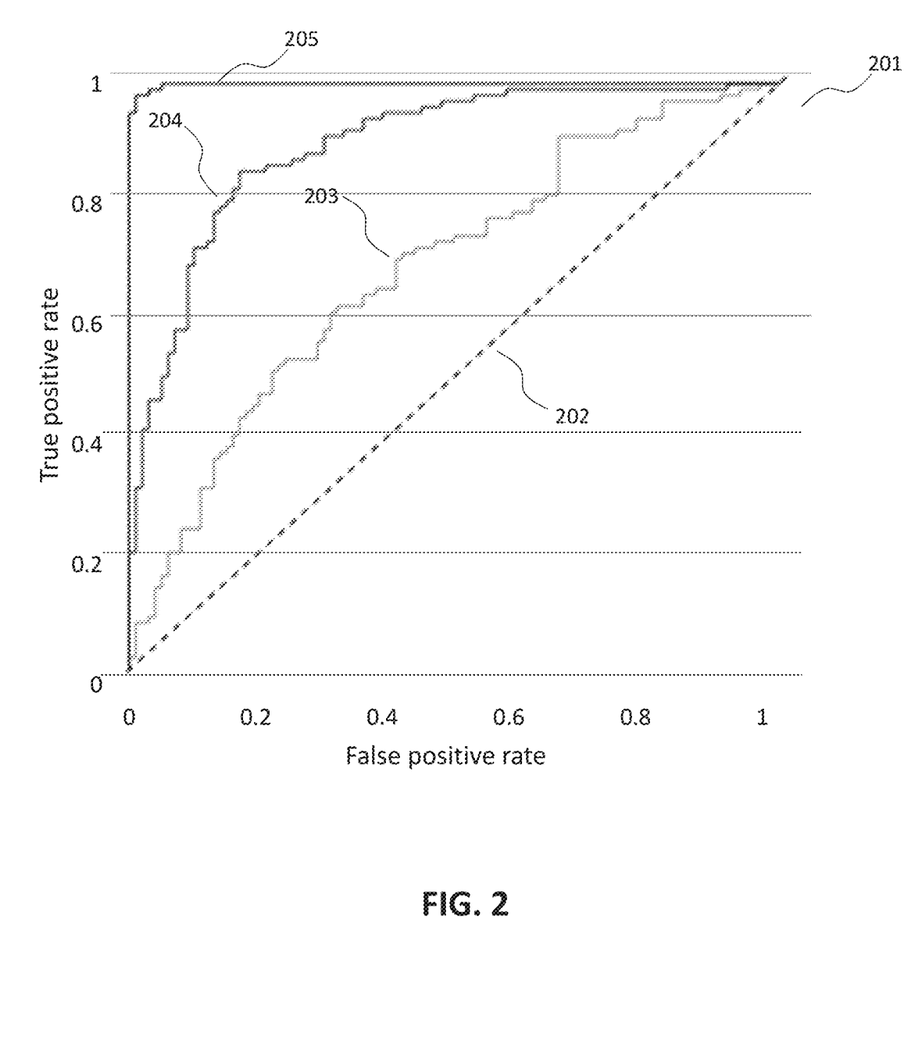
FIG. 2 show a few different receiver operator characteristics (ROC) curves which can be used to evaluate the value of a candidate feature for assessing a device's efficiency.

Candidate features can also be evaluated individually. For instance, a receiver operator characteristics (ROC) curve can be calculated for a candidate feature. Each ROC curve has an associated area under the curve (AUC). A feature that does not include useful information for diagnosis would have an AUC of 0.5 An AUC of close to 1, by contrast, indicates a very good feature. These are illustrated in FIG. 2 which includes a ROC chart (201) with four different curves 202-205. The AUC of curve 202 (no features are used) is about 0.5; the AUC of curve 203 is slightly greater than 202 suggesting that the underlying feature is useful; the AUC of curve 204 is even greater indicating a strong underlying feature; and the AUC of curve 205 is almost 1, suggesting an almost-perfect feature. Other pattern recognition and machine learning approaches can also be used to screen for or evaluate candidate features, such as random forest, support vector machine, neural network, linear discriminant analysis, quadratic discriminant analysis, and nearest neighbor.

In some embodiments, two or more features are used in combination. One way of identifying such combinations uses a forward selection method. A forward selection method, in one embodiment, starts with a best-performing feature among the candidate features and checks which other feature, when used in combination with the first selected feature, performs the best (e.g., generates the highest AUC) among the different combinations. Once such a two-feature combination is obtained, a third feature may be identified from the remaining candidate features in a similar fashion. Other methods of identifying feature combinations include backward elimination, exhaustive search of all combinations, and genetic algorithms.

For any selected feature or feature set, a data analysis model can also be identified which, along with the feature or feature set, are able to correctly associate a data set to a related condition. In one embodiment, the data analysis model is a random forest model. In another embodiment, the model is a support vector machine. In some embodiments, the model is selected from neural network, linear discriminant analysis, quadratic discriminant analysis, and nearest neighbor, without limitation.

In some implementations, a computing system is configured to conduct a diagnosis for one or more devices with one or more selected features. The diagnosis, in some embodiments, generates an efficiency score suggesting how likely a device is operating under an efficient or inefficient condition. For instance, such a score may be an efficiency score in the range of 0 to 100, where 100 denotes a condition under maximal efficiency and 0 being the opposite. For instance, in FIG. 3, based on the raw data shown as the curve 303 in chart 301, the system uses a selected feature set and a corresponding model to generate an efficiency score(s) for each data set. Some example efficacy scores are shown in curves 404 in FIG. 3, lower panel. It is noted that, in this figure, the efficiency scores are only calculated during periods when the device operates at relatively high intensity.

Figure 3:
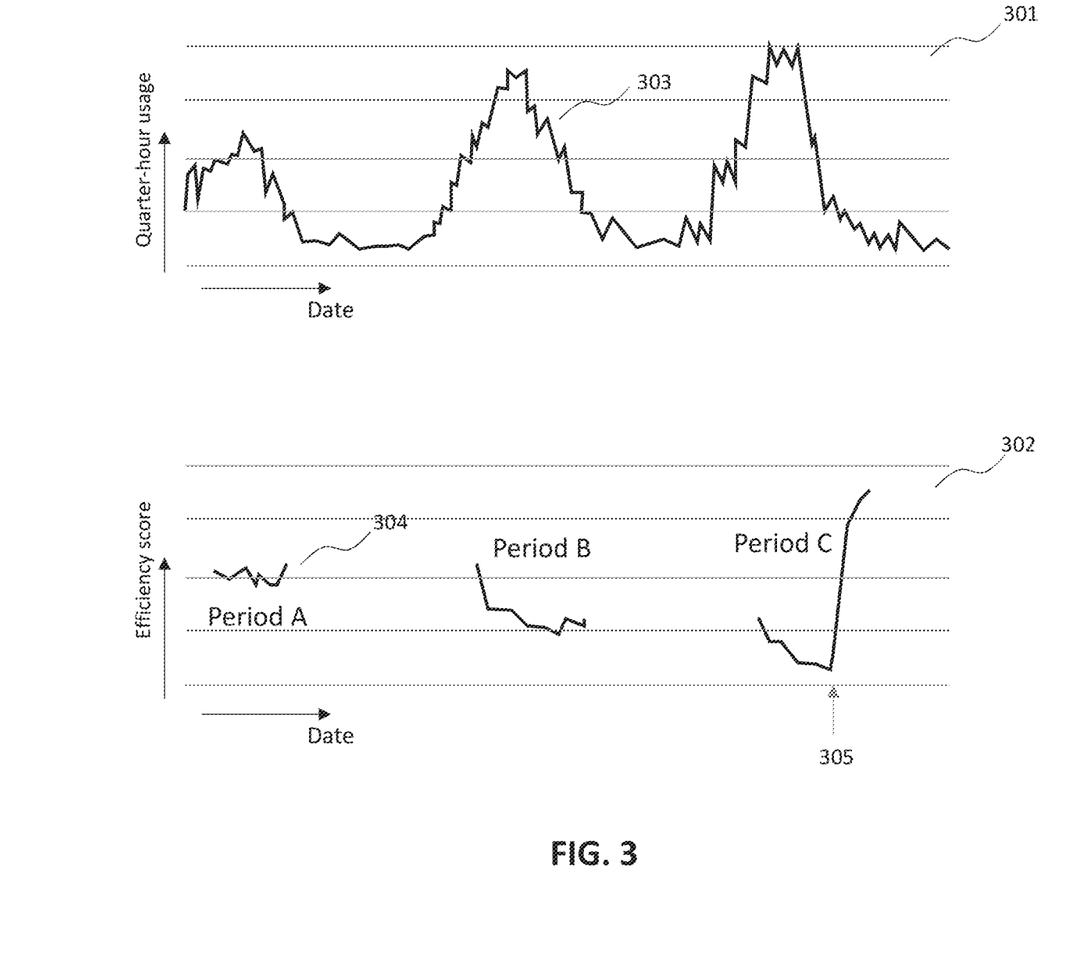
FIG. 3 shows a plot of the raw usage data (upper panel) and a plot of calculated efficiency scores (lower panel).

Comparing the efficiency scores in period A, period B and the first half of period C, it is apparent that the relevant efficiency of the tested device goes down at each period. At time point 305, however, the efficiency score shoots up dramatically. Apparently, the user of the device becomes aware of the low efficiency of the device which likely comes with other malfunctioning symptoms, and has the device repaired.

Rather than waiting for the device to break down as it may be the case of FIG. 3, it may be helpful to make the user aware of the declining efficiency of the device so that a repair or maintenance can be conducted preemptively (e.g., during period B in FIG. 3), to avoid or minimize the inefficient use of energy during the first half of period C. Further, in addition to helping the user save energy by alerting the user to increasingly inefficient functioning, this technology can also help the user identify "silent" problems before a total system failure. Even after a system failure, this technology can be greatly beneficial. For instance, the energy or resource provider or maintenance team can be immediately notified so that appropriate action (e.g., ordering parts, shutting down the inefficient device) can be taken expediently. In accordance with one embodiment of the present disclosure, therefore, provided are computer systems and methods configured for displaying data collected from the one or more devices, or the facility wherein the devices are located, along with results of the data analysis and recommendations. In one embodiment, the data are displayed on a user interface which includes a panel using chart or other suitable graphic means to represent the usage data. In another embodiment, automatic alerts can be generated by the system from analyzing the data and the alerts can be displayed or sent to the user or an appropriate maintenance team.

In one embodiment, the user interface includes a chart showing the relative efficiency of the device over a period of time. The showing of the efficiency data itself can be useful for a user, a technician, a maintenance team, or a vendor of services or devices, to decide on whether a repair, replacement or maintenance is required. In some embodiments, nevertheless, the user interface further shows markings, tagging, text, or other means to make a recommendation for repair, replacement or maintenance for a user. In one embodiment, the recommendation includes replacement with a different make or model of the device and the recommendation can optionally include a chart or statistic summary highlighting the improved performance of the recommended make or model. In some embodiments, the recommendation further includes an estimated saving (of energy, resource, or cost) if the recommendation is adopted.

A suitable recommendation, in one embodiment, entails alerting a user (e.g., the facility owner or tenant), a technician, a maintenance team, or a vendor of services or devices that the respective device is not operating under an efficient condition. Along with the alert, the recommendation can further include a history record of the device such as a decline of the efficacy over time. In some embodiments, the recommendation includes a comparison to a different device of the same kind which may suggest that an upgrade may be able to overcome certain limitation of the current device. For instance, the comparison may show that the current device has a steeper decline in the same period as compared to a new model.

In some embodiments, the recommendation includes a calculated saving of cost based on the recommendation. For example, with a recommendation for a repair or replacement, a number is presented to show that, upon such repair or replacement, a monthly saving of $100 can be achieved. In some embodiments, a follow-up is carried out which entails calculating the efficacy after a repair recommended by the system, to show that actual savings have been achieved.

Computing Environments, Modules and Methods

Figure 4:
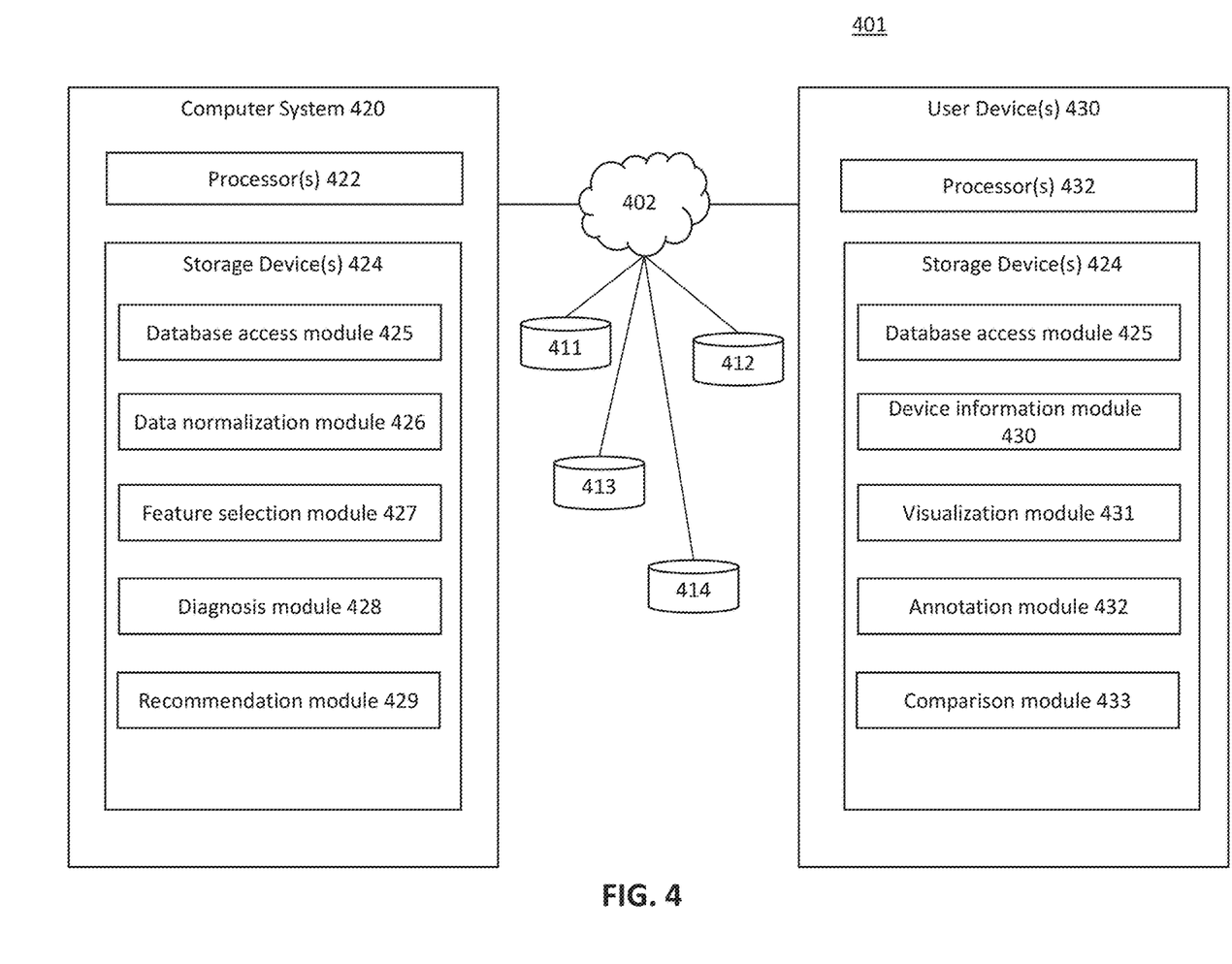
FIG. 4 illustrates an example environment for generating diagnosis features and models and using the features and models for making diagnosis of a device.

FIG. 4 depicts an example environment 401 for facilitating identification of useful features and data analysis models for the diagnosis of devices and using the features and models to make diagnosis and recommendations. In one implementation, the environment 401 may include one or more of a computer system 420, a user device 430, a feature data source 411, a data analysis model source 412, a facility information data source 413, and an environmental information data source 414, in communication via network 402, and/or other components. The data sources 411-413 are illustrated in FIG. 4 as being separate from the computer system 420 and the user device 430. In some implementations, some or all of the data sources 411-414 may be stored on computer system 420, user device 430, and/or at a remote location. In some implementations, the data sources 411-414 may be stored in the same location and/or may be stored in the same database. As illustrated in FIG. 4, each of the software modules may be in operation on user device 430 and/or on computer system 420. Various aspects of the system may operate on computer system 420 and/or on one or more user devices 430. That is, the various software modules described herein may each operate on one or both of computer system 420 and/or user device 430.

The data sources 411-414 may be computer memories configured to store data. Further, the data sources 411-414 may store data formatted according to object based data structures as described above. In some embodiments, the feature data source 411 may store candidate features or selected features useful for diagnosis. In some embodiments, the data analysis model source 412 stores information about data analysis models and their associated features and related parameters. In some embodiments, the facility information data source 413 stores information about properties of the facility that may be used for normalization or analysis of device usage data. In some embodiments, the environmental information data source 414 stores information about the environment in which the device is operated.

The computer system 420 may be configured as a server (e.g., having one or more server blades, processors, etc.), a personal computer (e.g., a desktop computer, a laptop computer, etc.), a smartphone, a tablet computing device, and/or other computing device that can be programmed to receive tabular data or object based data, provide services for the manipulation of the data, and provide services for transformation and display of the data.

Figure 6:
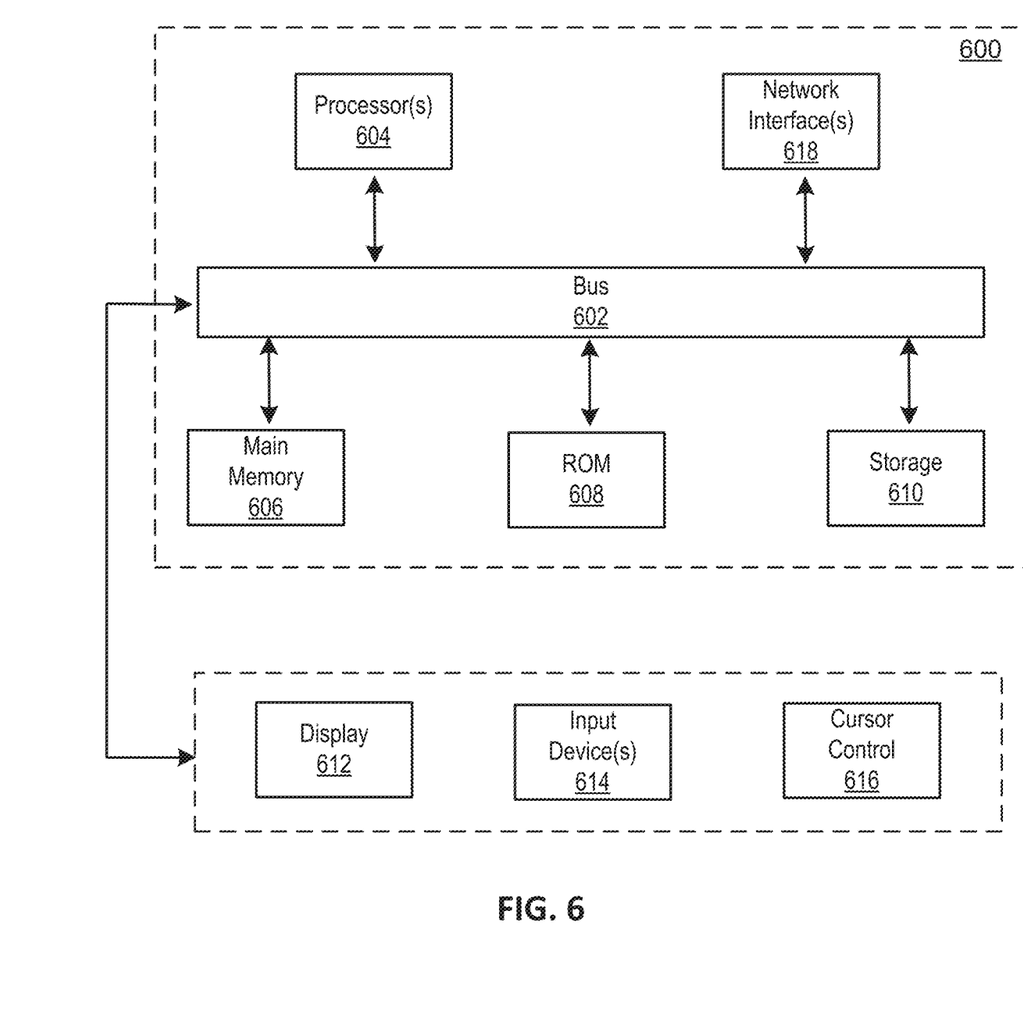
FIG. 6 illustrates a block diagram of an example computer system in which any of the implementations described herein may be implemented.

The computer system 420 may include one or more processors 422, one or more storage devices 424, and/or other components. Processors 422 may be programmed by one or more computer program instructions stored on storage device 424. For example, processors 422 may be programmed by database access module 425, data normalization module 426, feature selection module 427, diagnosis module 428, recommendation module 429, and/or other instructions that program computer system 420 to perform various operations, each of which are described in greater detail herein. As used herein, for convenience, the various instruction modules, systems, and engines will be described as performing an operation, when, in fact, the various instructions program the processors 422 (and therefore computer system 420) to perform the operation. Further details and features of a computer system 420 configured for implementing features of the described technology may be understood with respect to computer system 600 as illustrated in FIG. 6.

User device(s) 430 may be configured as a server (e.g., having one or more server blades, processors, etc.), a personal computer (e.g., a desktop computer, a laptop computer, etc.), a smartphone, a tablet computing device, and/or other device that can be programmed to receive tabular data or object based data, provide services for the manipulation of the data, and provide services for transformation and display of the data. In some embodiments, two or more user devices are included, each of which is connected to one another or to the computer system 420 over a network.

User device 430 may include one or more processors 432, one or more storage devices 424, and/or other components. Processors 424 may be programmed by one or more computer program instructions. For example, processors 422 may be programmed by database access module 425, device information module 430, visualization module 431, annotation module 432, comparison module 433, and/or other instructions that program computer system 420 to perform various operations, each of which are described in greater detail herein. As used herein, for convenience, the various instruction modules, systems, and engines will be described as performing an operation, when, in fact, the various instructions program the processors 422 (and therefore computer system 420) to perform the operation.

In various implementations, the database access module 425 may be a software module operating on computer system 420 and/or user device 430. Database access module 425 may be configured to provide system access to data sources, e.g., the data sources 411-414. Database access module 425 may be configured to read and write to data sources 411-414, as well as carry out searches, queries, and any other database functionality required by computer system 420 and/or user device 430.

The data normalization module 426, in some embodiments, is configured to retrieve usage data for a device or the facility where the device is located and normalize the data with one or more properties of the facility (from data source 413) and certain environmental information (from data 414). The feature selection module 427, in some embodiments, is configured to evaluate and select features from a list of candidate features which may be used together with a data analysis model for making a diagnosis, which may be conducted by the diagnosis module 428. The recommendation module 429, in some embodiments, is configured to make a recommendation based on the diagnosis, with respect to repair, replacement or upgrade.

The device module 430, in some embodiments, is configured to obtain information about the device, such as make and model, year of manufacturing, last maintenance date, without limitation. The visualization module 431, in some embodiments, is configured to display usage and efficiency scores on a user interface for a user to examine, analyze and understand the data. The annotation module 432, in some embodiments, is configured to allow a user to input annotation, through a user interface, into the database which might be useful for future analysis of a device. The comparison module 433, in some embodiments, is configured to integrate or compare data from different devices.

Figure 5:
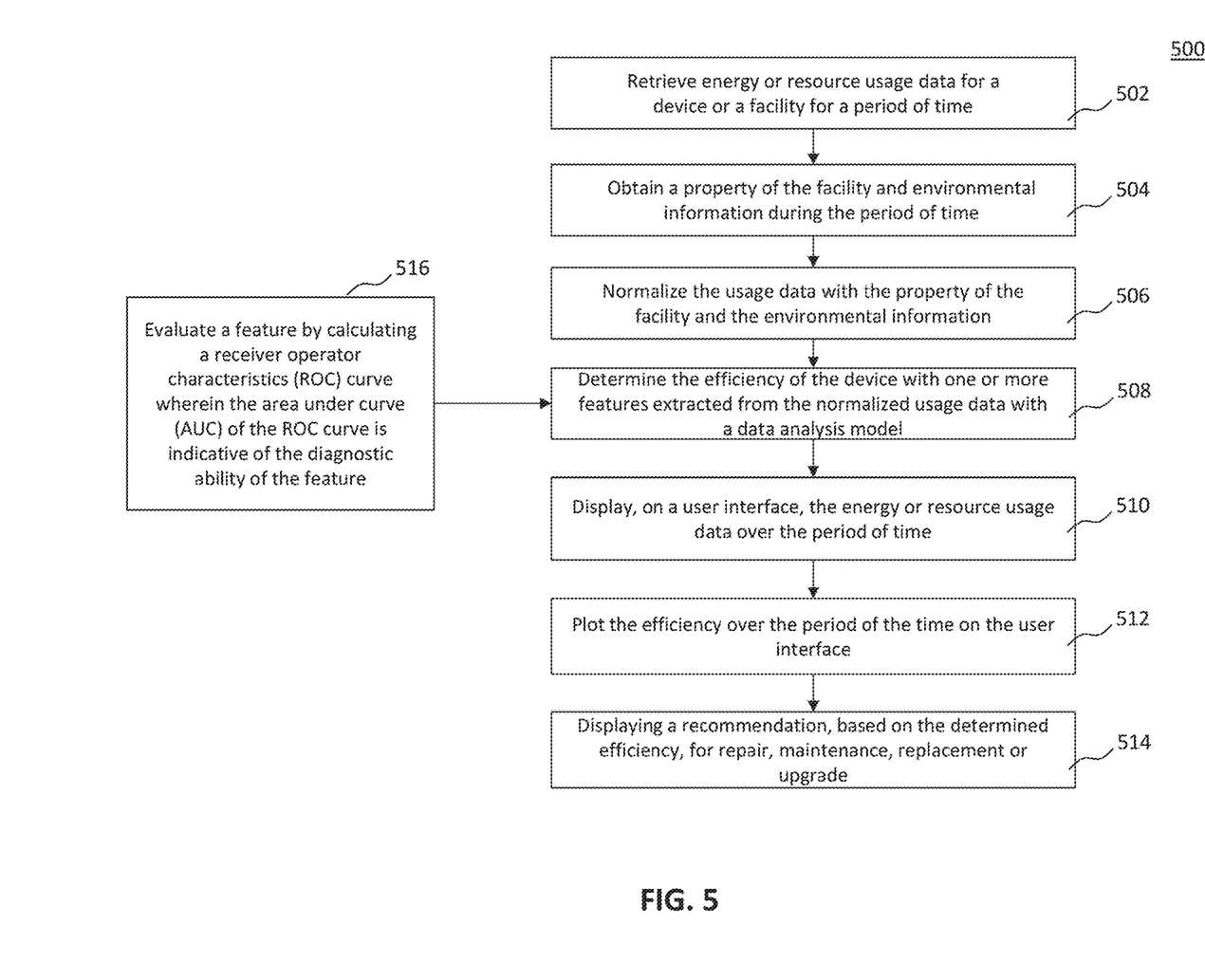
FIG. 5 illustrates an example process flow chart of a method, according to some implementations.

FIG. 5 depicts a process flow chart of a method 500 for determining the efficiency (or making a diagnosis) of a device. The various processing operations and/or data flows depicted in FIG. 5 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

At step 502, pursuant to a user command, the system, such as personal computing device, retrieve or receive energy or resource usage data for the device or the facility where the device is located for a period of time. In some embodiments, the period depends on the type of the device which can be, for example, a few months or years for a refrigerator. At step 504, the computer system further obtains obtain a property of the facility and environmental information during the period of time. With the property of the facility (e.g., square footage of the facility) and the environmental information (e.g., outside temperature), the usage data can be normalized (step 506).

At step 508, the normalized usage data can be analyzed with one or more features useful for making a diagnosis, along with associated data analysis model(s) to generate an efficiency score for the device. Evaluation of features can be done with data sets such as by a method that calculates a receiver operator characteristics (ROC) curve wherein the area under curve (AUC) of the ROC curve is indicative of the diagnostic ability of the feature (step 516).

The efficacy so determined can be displayed on a user interface (step 512), along with plotting of the original data, or its normalized form (step 510). In addition, suitable recommendations may be made based on the efficiency results with respect to repair, maintenance, replacement or upgrade (step 514).

FIG. 6 depicts a block diagram of an example computer system 600 in which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer-implemented method for determining an efficiency of a device at a facility, comprising:
    sensing, by a computing system, energy usage associated with the device from one or more sensors;
    retrieving, by the computing system, data associated with the energy usage from the one or more sensors;
    obtaining, by the computing system, data relating to characteristics and environment associated with the facility;
    normalizing, by the computing system, the data associated with the energy usage based on the data relating to characteristics and environment associated with the facility;
    training a machine learning model to distinguish an efficient operation of the device from an inefficient operation of the device using a training dataset that comprises a first group of datasets indicating an efficient condition after a repair or replacement and a second group of datasets indicating an inefficient condition prior to the repair or the replacement; and
    diagnosing, using the trained machine learning model, an efficiency of the device using the normalized data associated with the energy usage as inputs to the trained machine learning model, the diagnosing comprising:
        extracting feature candidates from the normalized data;
        identifying a first feature from the feature candidates that distinguishes an inefficient operation from an efficient operation;
        combining the first feature with each of other features in the feature candidates to obtaining feature combinations;
        determining an Area Under the Curve (AUC) value for each of the feature combinations;
        identifying a feature combination that has a largest AUC value out of the feature combinations;
        generating, using the trained machine learning model based on the feature combination, efficiency scores for one or more sub-timeframes within a timeframe, wherein the normalized data indicates that the device is operating at an intensity that exceeds a threshold during the one or more sub-timeframes; and
    based on the efficiency scores, generating an indication that a repair or a maintenance is to be conducted preemptively prior to a failure of the device.

2. The computer-implemented method of claim 1, wherein the data relating to the characteristics associated with the facility includes at least one of a square footage of the facility, a square footage of a room in which the device operates, an age of the facility, a type of insulation used in the facility, or directions of windows of the facility.

3. The computer-implemented method of claim 1, wherein the data relating to the characteristics associated with the facility includes at least one of external temperature, humidity, strength of sunlight, atmospheric pressure, altitude, latitude, or wind speed.

4. The computer-implemented method of claim 1, wherein the data associated with the energy usage is normalized based at least on one of one or more metrics of rolling averages, a maximal energy usage, a distribution of energy usage, a first derivative of an energy usage curve, a frequency and a duration of an on state and an off state associated with the device, heights of energy usage peaks, heights of energy usage troughs, differences between energy usage peaks and energy usage troughs, differences between adjacent energy usage peaks and energy usage troughs, temperatures at which the device is switched to an on state, or temperatures at which the device is switched to an off state.

5. The computer-implemented method of claim 1, wherein the machine learning is based at least on one of random forest, support vector machine, neural network, linear discriminant analysis, quadratic discriminant analysis, or nearest neighbor.

6. The computer-implemented method of claim 1, further comprising:
    determining a receiver operator characteristics curve (ROC) for each data type of the data relating to the characteristics and the environment associated with the facility, wherein the AUC corresponds to the ROC and indicates a degree of usefulness with which to normalize the data associated with the energy usage; and
    selecting a data type of the data relating to the characteristics and the environment associated with the facility with which to normalize the data associated with the energy usage based on a data type with the largest AUC.

7. The computer-implemented method of claim 1, further comprising:
    providing, by the computing system, the data associated with the energy usage for display on a user interface.

8. The method of claim 7, further comprising:
    providing, by the computing system, the efficiency scores of the device as a plot on the user interface.

9. The computer-implemented method of claim 8, further comprising:
    providing, by the computing system, a recommendation for repair, maintenance, replacement, or upgrade based on the efficiency scores of the device on the user interface.

10. A system for determining an efficiency of a device at a facility, comprising:
    a processor; and
    a memory storing instructions that, when executed by the processor, cause the system to:
        sense energy usage associated with the device from one or more sensors;
        retrieve data associated with the energy from the one or more sensors;
        obtain data relating to characteristics and environment associated with the facility;
        normalize the data associated with the energy usage based on the data relating to characteristics and environment associated with the facility;
        train a machine learning model to distinguish an efficient operation of the device from an inefficient operation of the device using a training dataset that comprises a first group of datasets indicating an efficient condition after a repair or replacement and a second group of datasets indicating an inefficient condition prior to the repair or the replacement; and diagnose, using the trained machine learning model, an efficiency of the device using the normalized data associated with the energy usage as inputs to the trained machine learning model, the diagnosing comprising:

extracting feature candidates from the normalized data;

combining a first feature with each of other features in the feature candidates to obtaining feature combinations;

determining an Area Under the Curve (AUC) value for each of the feature combinations;

identifying a feature combination that has a largest AUC value out of the feature combinations;

generating, using the trained machine learning model based on the feature combination, efficiency scores for one or more sub-timeframes within a timeframe, wherein the normalized data indicates that the device is operating at an intensity that exceeds a threshold during the one or more sub-timeframes; and based on the plurality of efficiency scores, generate an indication that a repair or a maintenance is to be conducted preemptively prior to a failure of the device.

11. The system of claim 10, wherein the data relating to the characteristics associated with the facility includes at least one of a square footage of the facility, a square footage of a room in which the device operates, an age of the facility, a type of insulation used in the facility, or directions of windows of the facility.

12. The system of claim 10, wherein the data relating to the characteristics associated with the facility includes at least one of external temperature, humidity, strength of sunlight, atmospheric pressure, altitude, latitude, or wind speed.

13. The system of claim 10, wherein the data associated with the energy usage is normalized based at least on one of one or more metrics of rolling averages, a maximal energy usage, a distribution of energy usage, first derivative of an energy usage curve, a frequency and a duration of an on state and an off state associated with the device, heights of energy usage peaks, heights of energy usage troughs, differences between energy usage peaks and energy usage troughs, differences between adjacent energy usage peaks and energy usage troughs, temperatures at which the device is switched to an on state, temperatures at which the device is switched to an off state.

14. The system of claim 10, wherein the machine learning is based at least on one of random forest, support vector machine, neural network, linear discriminant analysis, quadratic discriminant analysis, or nearest neighbor.

15. The system of claim 10, wherein the instructions, when executed, further causes the system to perform:

determining a receiver operator characteristics curve (ROC) for each data type of the data relating to the characteristics and the environment associated with the facility, wherein the AUC corresponds to the ROC and indicates a degree of usefulness with which to normalize the data associated with the energy usage; and selecting a data type of the data relating to the characteristics and the environment associated with the facility with which to normalize the data associated with the energy usage based on a data type with the largest AUC.

16. A non-transitory computer-readable medium of a computing system for determining an efficiency of a device at a facility storing instructions that, when executed by a processor, causes the computer system to:

sense energy usage associated with the device from one or more sensors;

retrieve data associated with the energy usage data from the one or more sensors;

obtain data relating to characteristics and environment associated with the facility;

normalize the data associated with the energy usage based on the data relating to characteristics and environment associated with the facility;

train a machine learning model to distinguish an efficient operation of the device from an inefficient operation of the device using a training dataset that comprises a first group of datasets indicating an efficient condition after a repair or replacement and a second group of datasets indicating an inefficient condition prior to the repair or the replacement; and diagnose, using the trained machine learning model, an efficiency of the device using the normalized data associated with the energy usage as inputs to the trained machine learning model, the diagnosing comprising:

extracting feature candidates from the normalized data;

combining a first feature with each of other features in the feature candidates to obtaining feature combinations;

determining an Area Under the Curve (AUC) value for each of the feature combinations;

identifying a feature combination that has a largest AUC value out of the feature combinations;

generating, using the trained machine learning model based on the feature combination, efficiency scores for one or more sub-timeframes within a timeframe, wherein the normalized data indicates that the device is operating at an intensity that exceeds a threshold during the one or more sub-timeframes; and based on the efficiency scores, generate an indication that a repair or a maintenance is to be conducted preemptively prior to a failure of the device.

17. The computer-implemented method of claim 1, wherein:

the feature identified is predicted to have a larger contribution in distinguishing an inefficient operation from an efficient operation compared to other features; and the feature is selected from one an external temperature gradient, a metric from a rolling window, a parameter associated with a maximum utilization of the device, a distribution of a usage, a first derivative of a usage curve, or frequencies and durations at which the device is in an on state and in an off state.

18. The computer-implemented method of claim 17, wherein a contribution of the feature in distinguishing an inefficient operation from an efficient operation is predicted based on area under a receiver operator curve (ROC) corresponding to the feature.

* * * * *